United States Patent [19]

Goel et al.

[11] Patent Number: 5,231,123
[45] Date of Patent: Jul. 27, 1993

[54] BASING CEMENT

[75] Inventors: Nidhi Goel, Titusville, N.J.; John A. Arbie, Sr., Towanda, Pa.; Kevin L. Brown, Milan, Pa.; Doris L. Brown, Towanda, Pa.

[73] Assignee: GTE Products Corporation, Stamford, Conn.

[21] Appl. No.: 459,504

[22] Filed: Jan. 2, 1990

[51] Int. Cl.$^5$ .......................... C08J 5/12; C08L 99/00
[52] U.S. Cl. ...................................... 524/77; 524/420; 524/423; 524/425
[58] Field of Search .................. 524/420, 423, 425, 77

[56] References Cited

FOREIGN PATENT DOCUMENTS

| 0139943 | 10/1979 | Japan | 524/423 |
| 0024439 | 3/1981 | Japan | 524/423 |
| 0660361 | 11/1951 | United Kingdom | 524/423 |

Primary Examiner—Paul R. Michl
Assistant Examiner—U. K. Rajguru
Attorney, Agent, or Firm—James Theodosopoulos

[57] ABSTRACT

A basing cement comprises, in weight percent, 80 to 85 filler material of limestone and lithopone, and 15 to 20 of binder resins including at least 6 weight percent of araucaria resin.

4 Claims, No Drawings

BASING CEMENT

This invention concerns basing cements which can be used in incandescent lamps. Such basing cements are disclosed in U.S. Pat. Nos. 2,633,457, 2,712,533, 2,722,522, 2,864,742, 3,525,898 and 3,876,559, which disclose the use of various fillers and binders. The prior art does not suggest basing cements having a composition as per this invention. The advantage of this invention is improved hot torque strength in incandescent lamp bases.

A basing cement in accordance with this invention is composed of 80 to 85 weight percent of filler material comprising limestone and lithopone and 15 to 20 weight percent of binder resins including at least 6 weight percent of araucaria resin.

In a preferred embodiment, the composition was, in weight percent, 71.9 limestone, 7.75 phenolic resin, 7.75 araucaria resin, 12.6 lithopone. Suppliers were, respectively: J. M. Huber Corporation, Quincy, Ill. as Hubercarb 100; Borden, Inc., Columbus, Ohio as Durite resin; Lehigh General Trading Inc., Bethlehem, Pa. as Respin RLP; and Charles Wagner Co., Philadelphia, Pa. as Lithopone 30%. the materials were well blended to form a dry basing cement. For application to lamp bases, the dry basing cement was well mixed with about 10% by weight of a solvent, for example, ethyl alcohol.

After application, the basing cement was then dried and cured to bond the base to the lamp bulb. A hot torque test was performed to measure the strength of the base-to-bulb bond under hot conditions. The hot torque for this composition was 115 pound-inches versus only 100.5 pound-inches for a generally used prior art composition, which contained phenol-formaldehyde resin, filler and shellac.

In another preferred embodiment, the composition was similar except that the composition contained only 6.25 weight percent of the phenolic resin and contained, in addition, 1.5 weight percent silicone resin. The silicone resin was Silicone Intermediate SY308, supplied by Wacker Silicones Corp., Edison, N.J. The hot torque strength of this composition was 114 pound-inches.

We claim:

1. A basing cement comprising, in weight percent, 80 to 85 filler material of limestone and lithopone, and 15 to 20 of binder resins including at lest 6 weight percent of araucaria resin.

2. The basing cement of claim 1 wherein the binder resins comprise phenolic and araucaria resin.

3. The basing cement of claim 1 comprising 71.9 limestone, 12.6 lithopone, 7.75 phenolic resin, 7.75 araucaria resin.

4. The basing cement of claim 1 comprising 71.9 limestone, 12.6 lithopone, 6.25 phenolic resin, 7.75 araucaria resin, 1.5 silicone resin.

* * * * *